United States Patent
Fukuta et al.

(10) Patent No.: US 9,090,168 B2
(45) Date of Patent: Jul. 28, 2015

(54) POWER CONVERSION APPARATUS PROVIDED WITH SUBSTRATE HAVING INSULATING AREA

(75) Inventors: Junichi Fukuta, Anjo (JP); Tsuneo Maebara, Nagoya (JP)

(73) Assignee: DENSO CORPORATION, Kariya (JP)

( * ) Notice: Subject to any disclaimer, the term of this patent is extended or adjusted under 35 U.S.C. 154(b) by 184 days.

(21) Appl. No.: 13/467,378

(22) Filed: May 9, 2012

(65) Prior Publication Data

US 2012/0286717 A1 Nov. 15, 2012

(30) Foreign Application Priority Data

May 10, 2011 (JP) .................................. 2011-105026

(51) Int. Cl.
*H02M 7/5387* (2007.01)
*H02P 23/00* (2006.01)
*B60L 11/12* (2006.01)
*H02M 7/00* (2006.01)

(52) U.S. Cl.
CPC .............. *B60L 11/123* (2013.01); *H02M 7/003* (2013.01); *Y02T 10/6217* (2013.01); *Y02T 10/7022* (2013.01); *Y02T 10/7077* (2013.01)

(58) Field of Classification Search
USPC .................. 318/722, 400.21, 400.3; 363/132; 257/E47.001
See application file for complete search history.

(56) References Cited

U.S. PATENT DOCUMENTS

| | | | | |
|---|---|---|---|---|
| 5,914,577 A | * | 6/1999 | Furnival | 318/538 |
| 8,422,235 B2 | * | 4/2013 | Azuma et al. | 361/736 |
| 2003/0095421 A1 | * | 5/2003 | Kadatskyy et al. | 363/65 |
| 2006/0033552 A1 | * | 2/2006 | Ishikawa et al. | 327/432 |
| 2006/0239050 A1 | * | 10/2006 | Andersson et al. | 363/132 |
| 2009/0121290 A1 | * | 5/2009 | Yamada et al. | 257/356 |
| 2010/0188814 A1 | * | 7/2010 | Nakatsu et al. | 361/689 |
| 2012/0007533 A1 | * | 1/2012 | Ogawa et al. | 318/503 |
| 2012/0300521 A1 | * | 11/2012 | Hida et al. | 363/131 |
| 2013/0321094 A1 | * | 12/2013 | Sumida et al. | 333/24.2 |

FOREIGN PATENT DOCUMENTS

| | | | |
|---|---|---|---|
| CA | 2355668 C | * | 6/2004 |
| JP | 2735912 B2 | * | 2/1998 |
| JP | 2010-119274 A | | 5/2010 |
| JP | 2010119274 A | * | 5/2010 |
| JP | 2011023384 A | * | 2/2011 |

* cited by examiner

*Primary Examiner* — Paul Ip
*Assistant Examiner* — Said Bouziane
(74) *Attorney, Agent, or Firm* — Nixon & Vanderhye PC

(57) ABSTRACT

A power conversion apparatus includes: a high-voltage circuit; a low-voltage circuit operating with an operating voltage lower than that of the high-voltage circuit; and a substrate. The substrate includes an edge section, portions corresponding to the low-voltage circuit and the high-voltage circuit formed thereon and a voltage conversion circuit converting a voltage range of the high-voltage to be capable of operating by the low-voltage circuit. The substrate is provided with an insulating area in a periphery of the high-voltage circuit, and the voltage conversion circuit being provided with an insulating area in a periphery thereof. The insulating area provided in the periphery of the voltage conversion circuit shares an area with at least either of the insulating area provided in the periphery of the high-voltage circuit and the edge section of the substrate.

17 Claims, 8 Drawing Sheets

POWER CONVERSION APPARATUS PROVIDED WITH SUBSTRATE HAVING INSULATING AREA

CROSS-REFERENCE TO RELATED APPLICATION

This application is based on and claims the benefit of priorities from earlier Japanese Patent Application No. 2011-105026 filed May 10, 2911, the descriptions of which are incorporated herein by reference.

BACKGROUND

1. Technical Field

The present application relates to a power conversion apparatus. More particularly, the present application relates to a power conversion apparatus provided with a high-voltage circuit and a low-voltage circuit, in which the high-voltage circuit includes a power conversion circuit, and the low-voltage circuit includes a device for operating the power conversion circuit. The low-voltage circuit operates with a lower operating voltage than the high-voltage circuit.

2. Description of the Related Art

As this type of power conversion apparatus, for example, as in JP-A-2010-119274, a power conversion apparatus is proposed in which the voltage between a pair of input terminals of an inverter connected to a rotating machine as an on-board main equipment (i.e., a primary source of vehicle driving torque) is inputted into a control circuit of the inverter. Specifically, in the power conversion apparatus, by using a wire harness, a collector terminal of an insulated gate bipolar transistor (IGBT) on the high-potential side and an emitter terminal of the IGBT on the low-potential side among the IGBTs configuring the inverter are connected to a substrate that includes a control circuit.

However, in the above-described power conversion apparatus, the wire harness and the control circuit are connected with a connector therebetween, on the substrate on which the control circuit is configured. As a result, the substrate increases in size.

SUMMARY

According to an aspect of the present application, a novel power conversion apparatus is provided that is configured to include a high-voltage circuit and a low-voltage circuit, in which the high-voltage circuit includes a power conversion circuit, and the low-voltage circuit includes a means for operating the power conversion circuit and has a lower operating voltage than the high-voltage circuit.

According to a first aspect of the present application, the power conversion apparatus includes a high-voltage circuit having a power conversion circuit that converts an input voltage of the power conversion circuit to a predetermined output voltage; a low-voltage circuit including a control unit that controls the power conversion circuit, the low-voltage circuit operating with an operating voltage lower than an operating voltage of the high-voltage circuit; a voltage conversion circuit that converts the input voltage of the power conversion circuit to be a voltage having a voltage range capable of operating by the control unit included in the low-voltage circuit, the voltage conversion circuit being provided with an insulating area in a periphery thereof; and a substrate provided with a first area where at least a portion of the high-voltage circuit is formed thereon, a second area where at least a portion of the low-voltage circuit is formed thereon, an edge section covering a periphery of the substrate and an insulating area in a periphery of the first area. The insulating area provided in the periphery of the voltage conversion circuit shares an area with at least either of the insulating area provided in the periphery of the first area and the edge section of the substrate.

Due to the fact that the operating voltage of the high-voltage circuit differs significantly from that of the low-voltage circuit, the potential difference between the high-voltage circuit and the low-voltage circuit increases. Therefore, for reasons, such as preventing insulation breakdown, a certain amount of distance is required to be provided. In addition, even between high-voltage circuits, a certain amount of distance is required to be secured between high-voltage circuits having significant potential difference in accompaniment with the operation thereof. Therefore, an insulating area is secured on the substrate. On the other hand, the voltage conversion circuit is connected to both the low-voltage circuit and the high-voltage circuit. Therefore, the power conversion circuit includes sections that require distance from the low-voltage circuit to be secured and sections that require distance from other high-voltage circuits to be secured. Here, when the insulating area in the periphery of such section of the voltage detection circuit shares an area with the insulating area in the periphery of another high voltage circuit, the proportion of the insulating area on the substrate can be reduced.

In addition, circuit elements cannot ordinarily be disposed in an edge section of the substrate. Therefore, when the insulating area in the periphery of the voltage detection circuit shares an area with the edge section of the substrate, the proportion of the insulating area in the substrate can be reduced.

According to a second aspect of the present application, the power conversion circuit is connected to a rotary electric machine serving as a primary source of vehicle driving torque.

The high-voltage circuit including the power conversion circuit connected to the primary source of vehicle driving torque has a significantly greater operating voltage than the low-voltage circuit including the means for operating the power conversion circuit. Therefore, the potential difference is significant between the high-voltage circuit and the low-voltage circuit, and between high-voltage circuits.

According to a third aspect of the present application, the high-voltage circuit and the low-voltage circuit communicate with each other via an insulating means.

When the high-voltage circuit and the low-voltage circuit communicate via the insulating means, the high-voltage circuit has a significantly greater operating voltage than the low-voltage circuit. Therefore, the potential difference is significant between the high-voltage circuit and the low-voltage circuit, and between high-voltage circuits.

According to a fourth aspect of the present application, a pair of input terminals of the voltage conversion circuit are formed on the substrate. The pair of input terminals are formed along at least either of the insulating area in the periphery of the first area and the edge section.

The operating voltage of the power conversion circuit is applied to the pair of input terminals. Therefore, the pair of input terminals are components that require distance from other circuits to be secured.

According to a fifth aspect of the present application, the power conversion circuit includes a boost circuit that boosts voltage at a DC power source and outputs a boosted voltage and a DC-AC conversion circuit electrically connected between the boost circuit and a rotary electric machine, converting the boosted voltage to an AC voltage. The voltage conversion circuit includes a first voltage conversion circuit that converts the boosted voltage and a second voltage conversion circuit that converts the voltage at the DC power source. Moreover, an input terminal having higher potential between the pair of input terminals of the first voltage conversion circuit and an input terminal having higher potential between the pair of input terminals of the second voltage conversion circuit are formed along at least either of the insulating area in the periphery of the first area and the edge section.

The operating voltage of the power conversion circuit is applied to the input terminals. Therefore, the input terminals are components that require distance from other circuits to be secured.

According to a sixth aspect of the present application, the power conversion circuit includes a plurality of resistors that divide a voltage potential between either one of the pair of input terminals and a ground potential of the low voltage circuit, and at least part of the plurality of resistors are formed along at least either of the insulating area in the periphery of the first area and the edge section.

A potential difference between an operating potential of the high-voltage circuit and the ground potential of the low-voltage circuit is applied to the plurality of resistors. As a result, the plurality of resistors are components to which a high voltage is applied. Therefore, the plurality of resistors are components that require distance from other circuits to be secured.

According to a seventh aspect of the present application, the insulating area provided in the periphery of the voltage conversion circuit shares an area with the insulating area provided in the periphery of another high-voltage circuit.

According to an eighth aspect of the present application, the insulating area provided in the periphery of the voltage conversion circuit shares an area with the edge section of the substrate.

According to a ninth aspect of the present application, the power conversion circuit includes a member composed of a high-potential switching element and a low-potential switching element connected in series. One input terminal of the voltage conversion circuit is either a terminal of the high-potential side switching element that is inserted into the substrate and has the same potential as an input terminal of the switching element or a terminal of the low-potential side switching element that is inserted into the substrate and has the same potential as an output terminal of the switching element.

In an instance in which the switching element is turned ON and OFF by the potential of an open/close control terminal of the switching element being operated, the potential uses either the potential of the input terminal or the potential of the output terminal of the switching element as reference. Therefore, the switching element tends to be connected to the wiring on the substrate such that a terminal having the same potential as either the input terminal or the output terminal can be connected to the low voltage circuit. In light of this point, this terminal is used in the invention according to the ninth aspect.

According to a tenth aspect of the present application, a capacitor is connected to the pair of input terminals of the power conversion circuit. The terminal serving as one input terminal of the voltage conversion circuit is nearest to the capacitor, among terminals having the same potential.

According to the tenth aspect, the terminal nearest to the capacitor is used. As a result, impedance between the capacitor and the voltage conversion circuit can be reduced. Therefore, the difference between the input voltage of the voltage conversion circuit and the voltage of the capacitor can be favorably reduced.

According to an eleventh aspect of the present application, the input terminal of the voltage conversion circuit is connected to the substrate by local flow soldering. At least a portion of at least either of the insulating area in the periphery of the first area and the edge section is included in an area in which disposal of components is prohibited because of the local flow soldering.

When a component is connected to the substrate by local flow soldering, an area in which components cannot be disposed is formed in the periphery (prohibited area). According to the eleventh aspect, this area shares an area with the insulating area and the edge section. Therefore, the proportion of these areas on the substrate can be reduced.

According to a twelfth aspect of the present application, the voltage conversion circuit includes a plurality of resistors that divide a voltage potential between either one of the pair of input terminals and a ground potential of the low voltage circuit. The resistors connected to each of the pair of input terminals are disposed in a single row along at least either of the insulating area in the periphery of the first area and the edge section, such that resistors on the ground potential side face each other.

According to a thirteenth aspect of the present application, the power conversion circuit includes a plurality of serially connected members, each composed of a high-potential side switching element and a low-potential side switching element. The high-potential side switching elements and the low-potential side switching elements are disposed in parallel with each other. The voltage conversion circuit includes a plurality of resistors for dividing a potential difference between each potential of a pair of input terminals and a ground potential of the low-voltage circuit. Groups of a plurality of resistors connected respectively connected to the pair of input terminals are disposed in parallel with each other between the row of high-potential side switching elements and the row of low-potential side switching elements. In addition, the groups of a plurality of resistors are disposed such that resistors closer to the ground potential side are placed nearer to a section in which the low-voltage circuit is disposed.

An insulating area is required to be included between the high-potential side switching elements and the low-potential side switching elements. In addition, due to packaging restrictions and the like, the distance between the high-potential side switching elements and the low-potential side switching elements may be large. Therefore, when the resistors are disposed between the high-potential side switching elements and the low-potential side switching elements, this area can be effectively used. In addition, the plurality of resistors sequentially become closer to the ground potential. Therefore, when the resistors closer to the ground potential are disposed nearer to another low-voltage circuit, insulation between the resistors and the other low-voltage circuit becomes unnecessary.

DETAILED DESCRIPTION OF THE PREFERRED EMBODIMENTS (First Embodiment)

An embodiment in which a drive unit of a power conversion circuit disclosed in the present application is applied to parallel and series hybrid cars will be described with reference to the drawings.

The power conversion circuit according to the embodiment is adapted to a rotary electric machine as an on-board main equipment (i.e., a primary source of vehicle driving torque).

With reference to FIGS. 1 to 4, the first embodiment according to the present application is described as follows.

Figure 1:
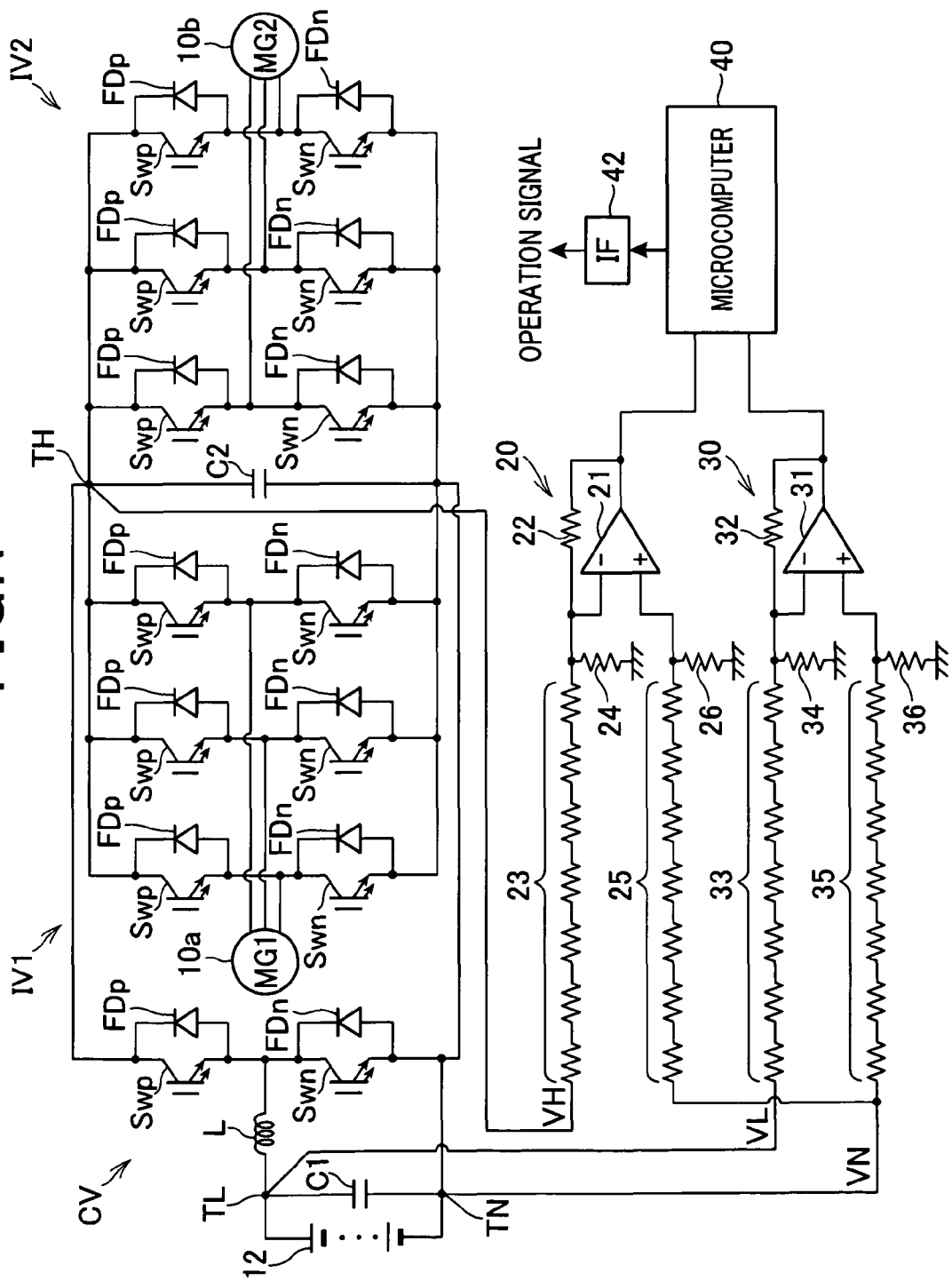
FIG. 1 is a system configuration diagram according to a first embodiment.

FIG. 1 shows a configuration of the power conversion circuit according to a first embodiment.

A first motor generator 10a and a second motor generator 10b shown in FIG. 1 are mechanically connected to a drive wheel and an internal combustion engine by a power divider. The first motor generator 10a is connected to an inverter IV1. The second motor generator 10b is connected to an inverter IV2. Here, the input voltages of the inverters IV1 and IV2 are the output voltage of a booster converter CV. The boost converter CV boosts the voltage of a high-voltage battery 12 (i.e., DC power source). The high-voltage battery 12 has a terminal voltage that is a high voltage of, for example, 100V or more. A capacitor C1 is connected to the input terminal of the boost converter CV. The capacitor C1 suppresses voltage fluctuations.

Each inverter IV1 and IV2 is configured by three serially connected members being connected in parallel. Each serially connected member is composed of a high-potential side switching element Swp and a low-potential side switching element Swn. The connection point between the switching element Swp and the switching element Swn in each serially connected member is connected to each phase of the respective first motor generator 10a or second motor generator 10b. In addition, the cathode and the anode of a high-potential side freewheeling diode FDp is connected between the input terminal and the output terminal (between the collector and the emitter) of each high-potential side switching element Swp. The cathode and the anode of a low-potential side freewheeling diode FDn is connected between the input terminal and the output terminal (between the collector and the emitter) of each low-potential side switching element Swn. On the other hand, the boost converter CV includes a serially connected member, a capacitor C2, and an inductor L. The serially connected member is composed of a high-potential side switching element Swp and a low-potential side switching Swn. The capacitor C2 is connected in parallel to the serially connected member. The inductor L connects the connection point between the high-potential side switching element Swp and the low-potential side switching Swn with the high-voltage battery 12.

The switching elements Sw# (#=p and n) configuring the above-described inverters IV1 and IV2 and the boost converter CV are all power semiconductors. Specifically, the switching elements Sw# are insulated gate bipolar transistors (IGBT).

On the other hand, a microcomputer (microcomputer 40) is a digital processing means for controlling the controlled variables of the first motor generator 10a and the second motor generator 10b by controlling the above-described inverters IV1 and IV2. In addition, the microcomputer 40 controls the switching elements Sw# of the boost converter CV, thereby manipulating the output voltage of the boost converter CV. Specifically, the microcomputer 40 controls the inverters IV1 and IV2 and the boost converter CV by outputting operation signals to each switching element Sw# of the inverters IV1 and IV2 and the boost converter CV via an interface 42. The interface 42 includes an insulating means, such as a photocoupler. Here, the interface 42 includes the insulating means to insulate between a high-voltage system including the inverters IV1 and IV2 and the high-voltage battery 12, and a low-voltage system including the microcomputer 40. The microcomputer 40 corresponds to the control unit.

The microcomputer 40 monitors the input voltages of the boost converter CV and the inverters IV1 and IV2 in order to generate the operation signals. The microcomputer 40 does so by being provided with differential amplifier circuits 20 and 30. The differential amplifier circuits 20 and 30 convert the input voltages of the inverters IV1 and IV2 and the boost converter CV to voltages that can be inputted into an analog-to-digital converter within the microcomputer 40. The differential amplifier circuits 20 and 30 with resistors correspond to the voltage conversion circuit.

Each differential amplifier circuit 20 and 30 provides a function for converting the potential of a pair of input terminals to a potential at ground reference of the low-voltage system including the microcomputer 40. A reason for this is that, according to the embodiment, the reference potential of the high-voltage system differs from the reference potential of the low-voltage system. Specifically, potential VN of the input terminals on the negative-electrode side of the boost converter CV and the inverters IV1 and IV2 serving as the reference potential is lower than the reference potential in the low-voltage system. A reason for this is that, according to the first embodiment, the median value of a positive electrode potential and a negative electrode potential of the capacitor C1 serves as the reference potential of the low-voltage system. This can be actualized by the voltage at both ends of the capacitor being divided by resistance, and the divided voltage being used as the reference potential of the low-voltage system. The reference potential of the low-voltage system is a ground potential (vehicle body potential).

The differential amplifier circuit 20 (i.e., first voltage conversion circuit) is a means for converting the potential difference between the potential of the input terminals on the positive-electrode side of the inverters IV1 and IV2 (potential VH of terminal TH on the positive-electrode side of the capacitor C1) and the potential of the input terminals on the negative electrode side (potential VN of terminal TN on the negative-electrode side of the capacitor C1). The differential amplifier circuit 20 includes an operation amplifier 21. Here, the potential difference between the potential VH of the terminal TH and the ground potential is divided by a plurality of high-resistance resistors 23 and a low-resistance resistor 24, and subsequently applied to an inverting input terminal of the operational amplifier 21. In addition, the potential difference between the potential VN of the terminal TN and the ground potential is divided by a plurality of high-resistance resistors 25 and a low-resistance resistor 26, and subsequently applied to a non-inverting input terminal of the operational amplifier 21. The inverting input terminal and the output terminal of the operational amplifier 21 are connected by a resistor 22.

The differential amplifier circuit 30 (i.e., second voltage conversion circuit) is a means for converting the potential difference between the potential of the input terminal on the positive-electrode side of the boost converter CV (potential VL of terminal TL on the positive-electrode side of the capacitor C1) and the potential VN of the terminal TN. The differential amplifier circuit 30 includes an operational amplifier 31. Here, the potential difference between the potential VL of the terminal TL and the ground potential is divided by a plurality of high-resistance resistors 33 and a low-resistance resistor 34, and subsequently applied to an inverting input terminal of the operational amplifier 31. In addition, the potential difference between the potential VN of the terminal TN and the ground potential is divided by a plurality of high-resistance resistors 35 and a low-resistance resistor 36, and subsequently applied to a non-inverting input terminal of the operational amplifier 31. The inverting input terminal and the output terminal of the operational amplifier 31 are connected by a resistor 32.

Figure 2:
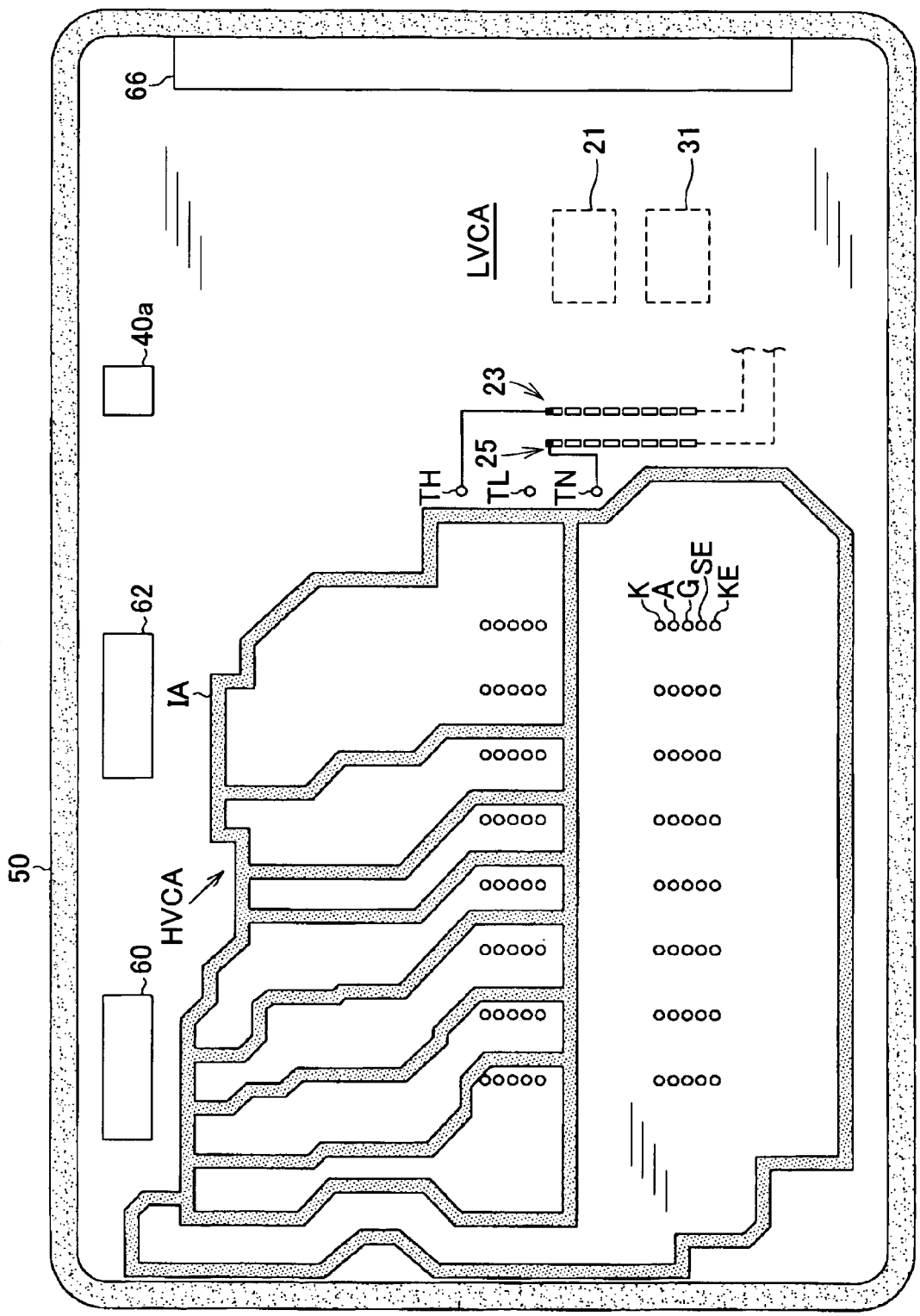
FIG. 2 is a planar view of a semiconductor substrate according to the first embodiment.

FIG. 2 shows a substrate (semiconductor substrate 50) on which the inverters IV1 and IV2, the boost converter CV, the differential amplifier circuits 20 and 30, and the like are mounted according to the first embodiment.

The semiconductor substrate 50 shown in FIG. 2 has both a high-voltage circuit area HVCA (i.e., first area) and a low-voltage circuit area LVCA (i.e., second area). A central processing unit (CPU 40a) included in the microcomputer 40 and the differential amplifier circuits 20 and 30 are mounted in LVCA.

The high-voltage circuit area HVCA is connected to the inverters IV1 and IV2 and the boost converter CV. Here, in general, the area on the right-hand side in FIG. 2 is the low-voltage circuit area LVCA. The area on the left-hand side is the high-voltage circuit area HVCA. However, components configuring both the low voltage system and the high voltage system, such as a photocoupler, are included within the high-voltage circuit area HVCA. In addition, transformers 60 and 62 for a flyback converter also composing both the low voltage system and the high voltage system are disposed on the left-hand side in FIG. 2. The flyback converter serves as a power supply for the drive circuit of each switching element Sw# of the inverters IV1 and IV2 and the boost converter CV.

In FIG. 2, a connector 66 is used to connect the ground of the low voltage system (body of the vehicle), a power supply line of a low-voltage battery of which the terminal voltage is, for example, the voltage ranges from 10V to less 20V, a controller area network (CAN) communication line, and the like to a low voltage circuit on the semiconductor substrate 50. The CPU 40a controls the first motor generator 10a and the second motor generator 10b by receiving, through the connector 66, torque command values and the like for the first motor generator 10a and the second motor generator 10b from a high-order electronic control unit (ECU) provided externally.

Figure 3:
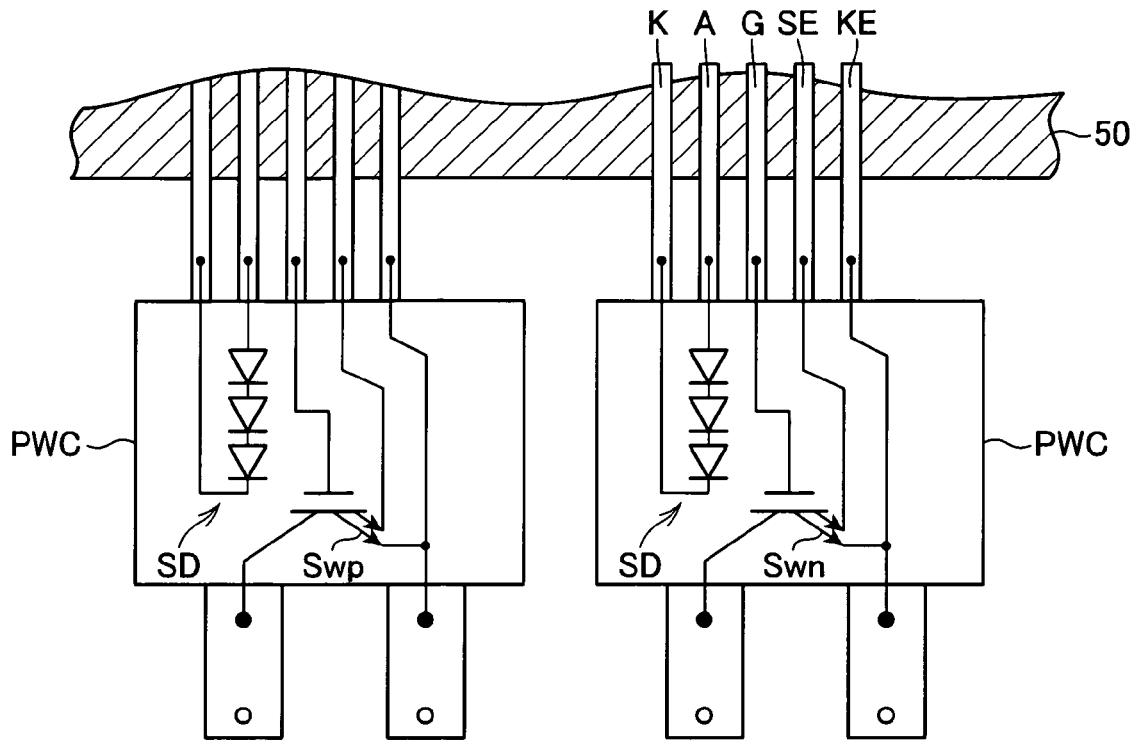
FIG. 3 is a diagram of a method of connecting a power device to the semiconductor substrate according to the first embodiment.

As shown in FIG. 3, each switching element Sw# of the inverters IV1 and IV2 and the boost converter CV is connected to the semiconductor substrate 50 by being inserted from a back-surface side of the semiconductor substrate 50 (the back surface of the surface shown in FIG. 2). Here, each switching element SW# is packaged by being housed in a power card PWC. The freewheeling diode FD# and a thermosensitive diode SD are also housed in the power card PWC. However, the freewheeling diode FD# is omitted in FIG. 3.

The power card PWC housing the high-potential side switching element Swp and the power card PWC housing the low-potential side switching element Swn have the same structure.

In both power cards PWC, an open/close control terminal (gate G), a Kelvin emitter electrode KE, a sense terminal, and the anode A and the cathode K of the thermo-sensitive diode SD are each connected to the semiconductor substrate 50 by being inserted therein. Here, the Kelvin emitter electrode KE is an electrode having the same potential as the emitter of the switching element Sw#. The sense terminal SE is a terminal for outputting a minute current correlated with the current flowing through the switching element Sw#.

As shown in FIG. 2 described earlier, the switching elements Sw# configure the high voltage system. Therefore, the semiconductor substrate 50 is provided with an insulating area IA to insulate these switching elements Sw# from other circuits. The insulating area IA is an area in which circuits (elements and wiring) are not disposed. Here, the bottom row in FIG. 2 shows the terminals of the power cards PWC including the low-potential side switching elements Swn. The insulating area IA is not provided between these low-potential side switching elements Swn because the Kelvin emitter electrodes KE corresponding to these low-potential side switching elements Swn all have the same reference potential (the potential VN at the terminal TN). Therefore, the drive circuits that drive these low-potential side switching elements Swn operate at a predetermined voltage range with this potential as reference. Here, the operating voltages itself of the constituent components of these drive circuits are not necessarily greater than those of the components within the low-voltage circuit area LVCA. Therefore, the drive circuits of the low-potential side switching elements Swn that differ from one another are not necessarily required to be provided with the insulating area IA on the semiconductor substrate 50.

On the other hand, the top row in FIG. 2 shows the terminals of the power cards PWC that include the high-potential side switching elements Swp. These high-potential side switching elements Swp are separated from one another by the insulating area IA. A reason for this is that the potential of the Kelvin emitter electrode KE of each high-potential side switching element Swp significantly varies from one another depending on whether the corresponding low-potential side switching element Swn is ON or OFF. Therefore, although the operating voltages itself of these drive circuits are small, the drive circuits are required to be insulated from each other. However, the two power cards PWC on the right end of the row of high-potential side power cards PWC are not separated by the insulating area IA. This is in correspondence with the switching elements Swp of the two power cards PWC forming a pair of switching elements Swp to increase the maximum value of the output current of the switching element Swp configuring the boost converter CV. In this instance, because the pair of switching elements have the same potential, these switching elements are not required to be separated by the insulating area IA.

The width of the insulating area IA is determined based on requirement under law or from the perspective of preventing insulation breakdown or the like. For convenience, the drawings only show that the five terminals of the power card PWC are provided within the area isolated by the insulating area IA. The constituent components of the drive circuits for turning ON and OFF the switching elements Sw# that are connected to the terminals are omitted in the drawings.

Figure 4:
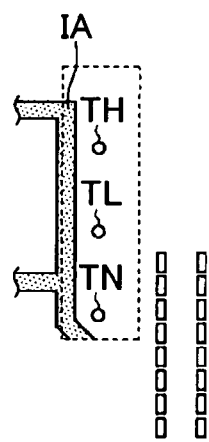
FIG. 4 is a planar view for explaining the effects according to the first embodiment.

Here, according to the first embodiment, the above-described terminals TH, TL, and TN are disposed along the insulating area IA. The terminals TH, TL, and TN are set in this manner to improve integration of the semiconductor substrate 50. In other words, because the terminals TH, TL, and TN configure the high voltage system, they are required to be separated from the other components. In FIG. 4, an area in which other components cannot be disposed as a result of the terminals TH, TL, and TN being disposed is outlined by a broken line. Integration of the semiconductor substrate 50 can be improved by this area (i.e., insulating area of the voltage conversion circuit) sharing the same area as the insulating area IA (i.e., insulating area of the first area) required as a result of the power cards PWC and the like being disposed.

In FIG. 2 described earlier, the resistors configuring the differential amplifier circuit 20 are shown with a solid line and the differential amplifiers 21 and 31 are shown with a dotted line because the semiconductor substrate 50 is a double-sided substrate. The resistors configuring the differential amplifier circuit 30 are disposed on the front surface (surface as shown in FIG. 2) of the semiconductor substrate 50. In contrast, the differential amplifiers 21 and 31 are disposed on the back surface of the semiconductor substrate 50. The high-resistance resistors 23 and the high-resistance resistors 25 are each composed of a plurality of resistors to ensure insulation distance. In other words, if the high-resistance resistor 23 and the high-resistance resistor 25 are each configured by a single resistor, sufficient distance is required between both ends. However, configuring a component meeting this requirement is difficult. Therefore, the high-resistance resistors 23 and the high-resistance resistors 25 are each configured by a plurality of resistors. In addition, space is provided between the terminals TH, TL, and TN to ensure insulation between the terminals TH, TL, and TN.

(Second Embodiment)

A second embodiment will hereinafter be described with reference to FIG. 5, mainly focusing on differences from the first embodiment.

Figure 5:
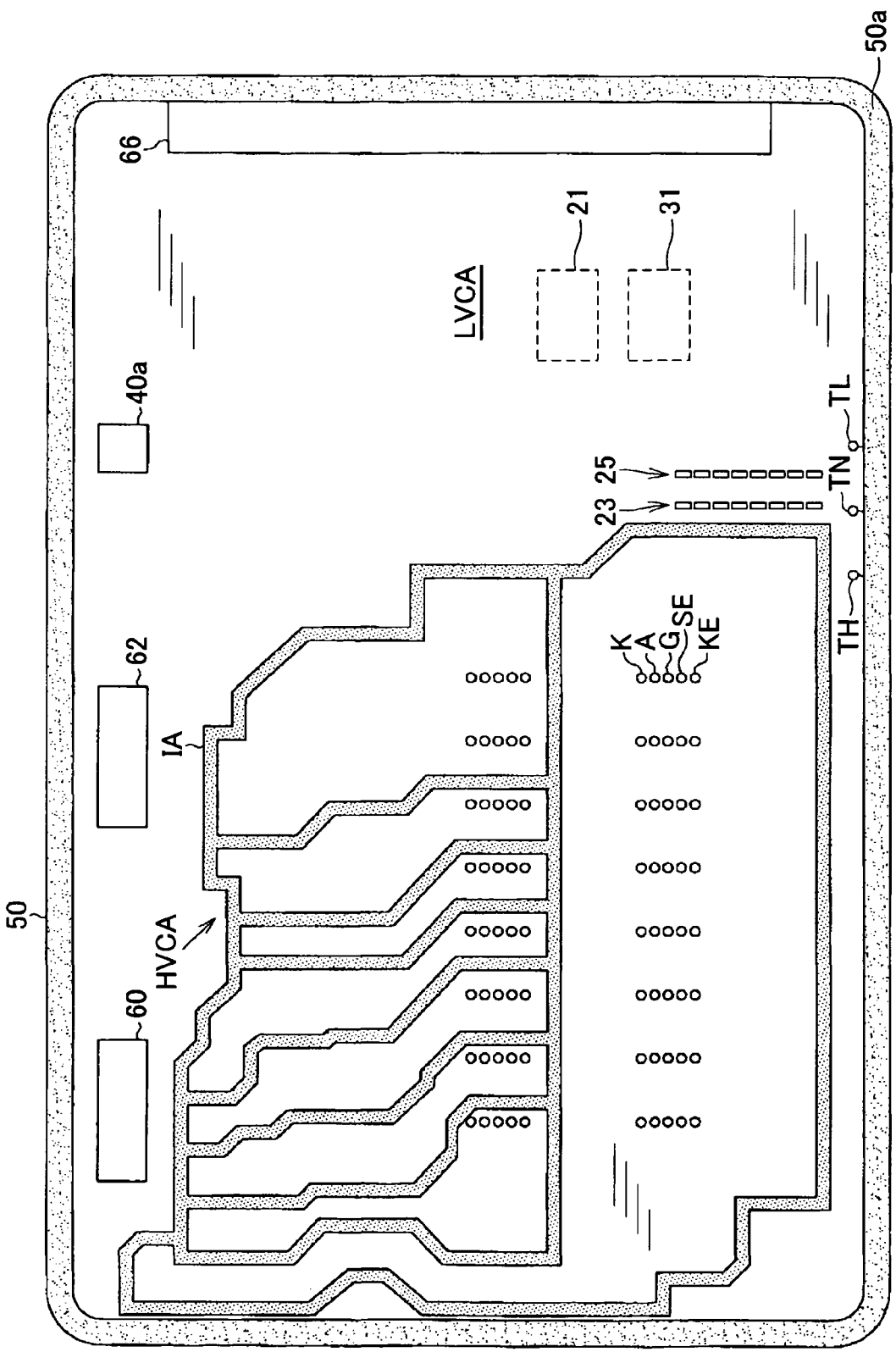
FIG. 5 is a planar view of a semiconductor substrate according to a second embodiment.

FIG. 5 shows the semiconductor substrate 50 according to the second embodiment. In FIG. 5, components corresponding to the components shown in FIG. 2 are given the same reference numbers for convenience.

As shown in FIG. 5, according to the second embodiment, the high-resistance resistors 23 are disposed along the insulating area IA. The high-resistance resistors 25 are disposed along the high-resistance resistors 23. Furthermore, according to the second embodiment, the terminals TH, TL, and TH are disposed along an edge section 50a of the semiconductor substrate 50 (i.e., belt-shape section covering a periphery of the semiconductor substrate 50). Here, the edge section of the semiconductor substrate 50 is an area in which components cannot ordinarily be disposed (shown in FIG. 5 as an area lighter in color than the insulating area IA). On the other hand, components cannot be disposed in the periphery of the terminals TH, TL, and TN either. Therefore, integration of the semiconductor substrate 50 can be improved by the insulating area provided in the periphery of the terminals TH, TL, and TN to insulate these terminals sharing the same area as the area in which components cannot be disposed in the edge section 50a of the semiconductor substrate 50.

(Third Embodiment)

A third embodiment will hereinafter be described with reference to FIG. 6, mainly focusing on differences from the first embodiment.

Figure 6:
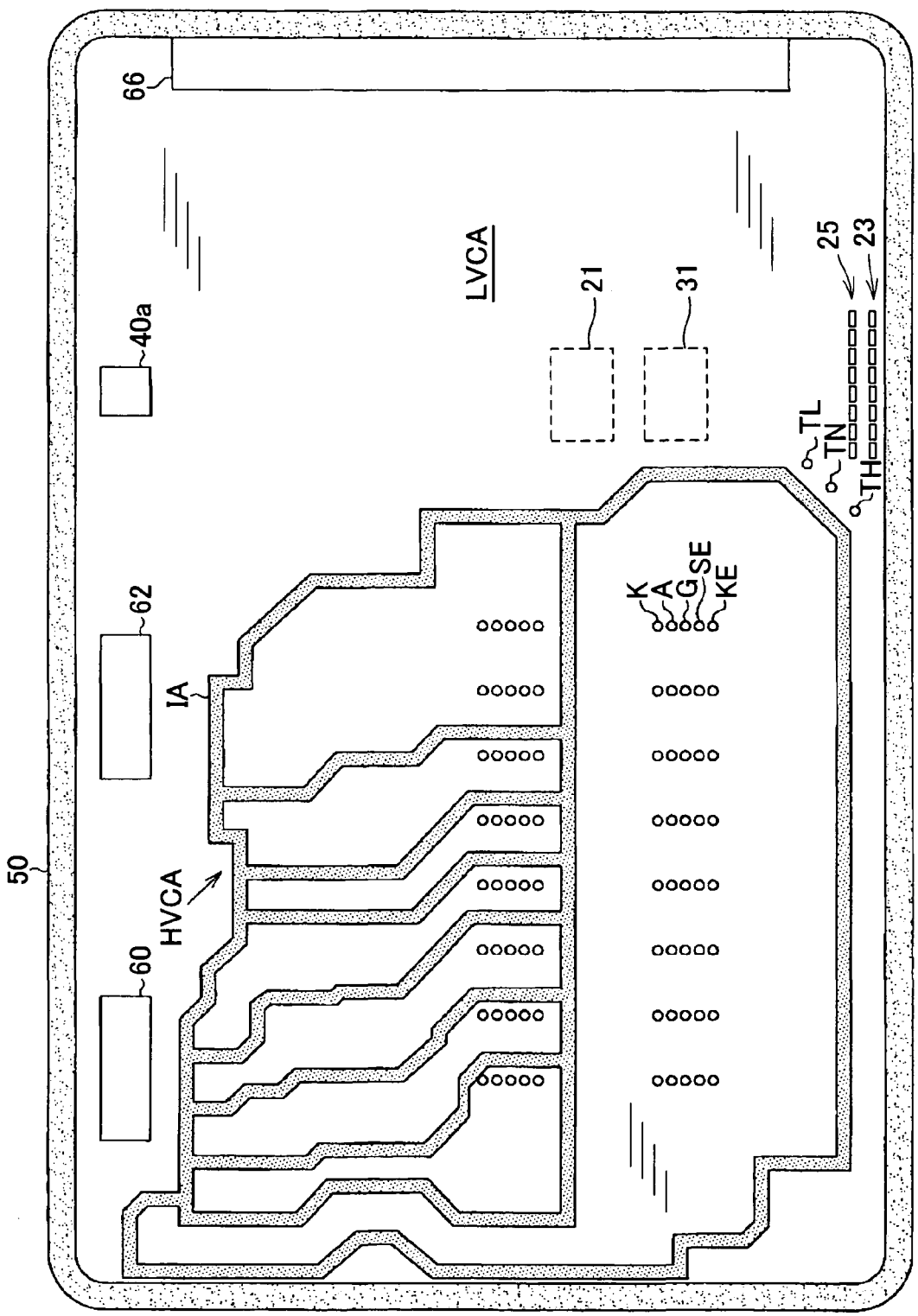
FIG. 6 is a planar view of a semiconductor substrate according to a third embodiment.

FIG. 6 shows the semiconductor substrate 50 according to the third embodiment. In FIG. 6, components corresponding to the components shown in FIG. 2 are given the same reference numbers for convenience.

According to the third embodiment, the terminals TH, TL, and TN are disposed along the insulating area. The high-resistance resistors 23 are disposed along the edge section of the semiconductor substrate 50.

(Fourth Embodiment)

A fourth embodiment will hereinafter be described with reference to FIG. 7, mainly focusing on differences from the first embodiment.

Figure 7:
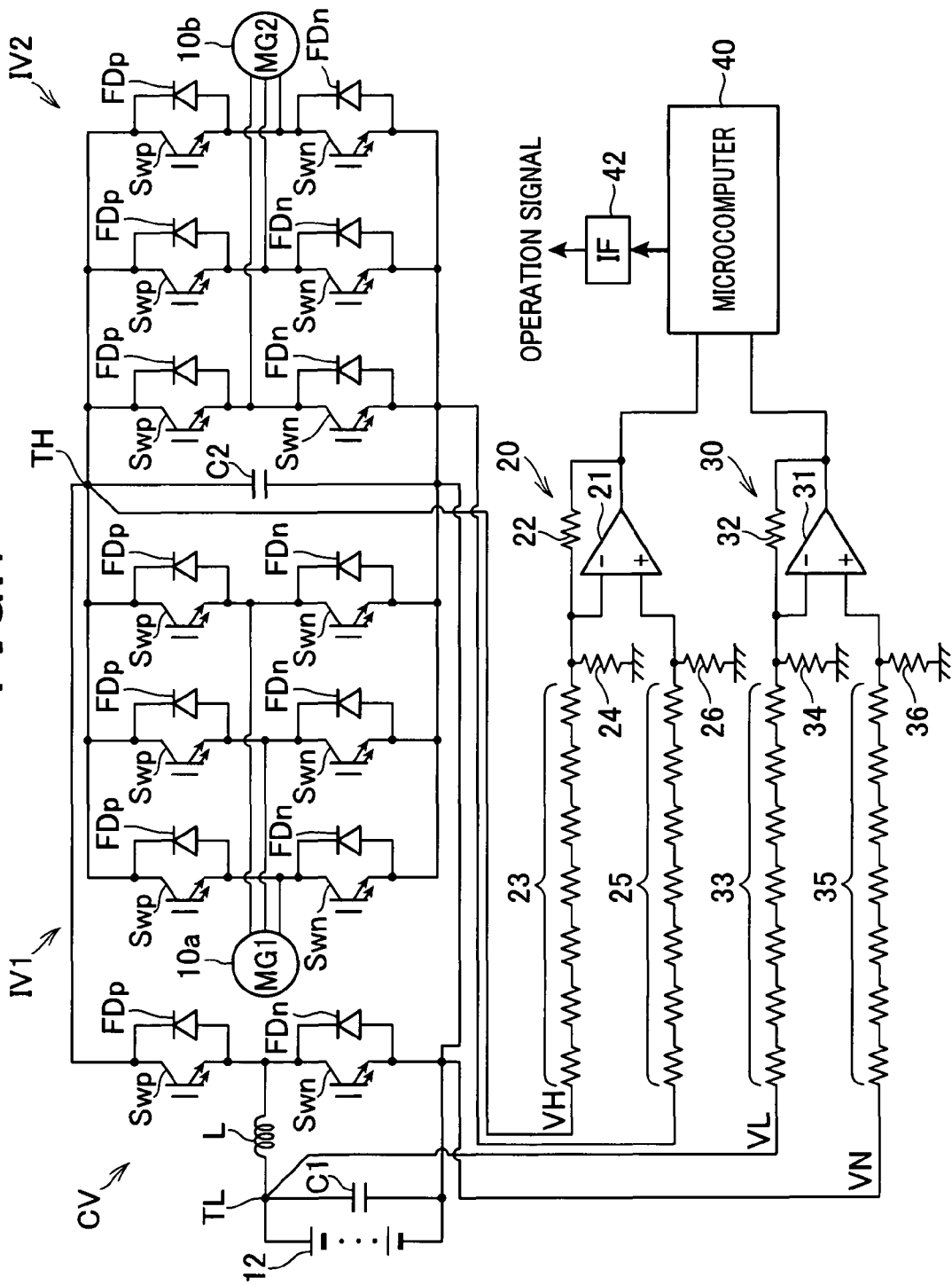
FIG. 7 is a system configuration diagram according to a fourth embodiment.

FIG. 7 shows a system configuration according to the fourth embodiment. In FIG. 7, components corresponding to the components shown in FIG. 1 are given the same reference numbers for convenience.

According to the fourth embodiment, the negative-electrode side input terminals of the differential amplifier circuits 20 and 30 are substituted by the Kelvin emitter electrodes KE of the low-potential side switching elements Swn. In particular, according to the fourth embodiment, the negative-electrode side input terminal of the differential amplifier circuit 20 is substituted by the Kelvin emitter electrode KE of the switching element Swn nearest to the capacitor C2. The negative-electrode side input terminal of the differential amplifier circuit 30 is substituted by the Kelvin emitter electrode KE of the switching element Swn nearest to the capacitor C1.

(Fifth Embodiment)

A fifth embodiment will hereinafter be described with reference to FIG. 8, mainly focusing on differences from the first embodiment.

Figure 8:
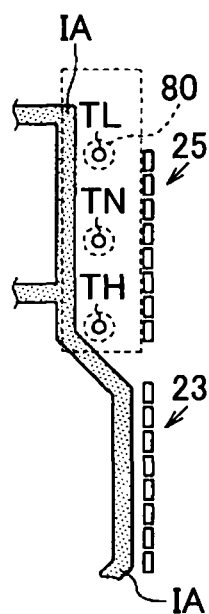
FIG. 8 is a planar view of a layout on a semiconductor substrate according to a fifth embodiment.

FIG. 8 shows a portion of the semiconductor substrate 50 according to the fifth embodiment. In FIG. 8, components corresponding to the components shown in FIG. 2 are given the same reference numbers for convenience.

According to the fifth embodiment, the terminals TH, TL, and TN are connected to the semiconductor substrate 50 by local flow soldering 80. Here, after a small-scale component, such as the CPU 40a, is connected to the semiconductor substrate 50 by a reflow-type automatic soldering process or the like, the local flow soldering 80 is used to connect a relatively large-scale component to the semiconductor substrate 50. Specifically, the local flow soldering 80 is performed by immersing a connection area in molten solder after the semiconductor substrate 50 is preheated. For reasons such as disposal of a palette to protect peripheral components, an area in which components cannot be disposed is formed in the periphery of the local flow soldering 80. The area is outlined by broken lines in FIG. 8. According to the fifth embodiment, integration of the semiconductor substrate 50 can be improved by this area sharing the same area as the insulating area IA.

In addition, the high-resistance resistors 25 are disposed along the area outlined by the broken line in FIG. 8. As a result, integration of the semiconductor substrate 50 can be further improved. The high-resistance resistors 23 are disposed along the insulating area IA.

(Sixth Embodiment)

A sixth embodiment will hereinafter be described with reference to FIG. 9, mainly focusing on differences from the first embodiment.

Figure 9:
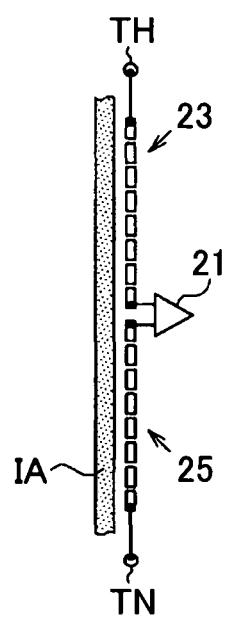
FIG. 9 is a planar view of a layout on a semiconductor substrate according to a sixth embodiment.

FIG. 9 shows a portion of the semiconductor substrate 50 according to the sixth embodiment. In FIG. 9, components corresponding to the components shown in FIG. 2 are given the same reference numbers for convenience.

According to the sixth embodiment, when the high-resistance resistors 23 and the high-resistance resistors 25 are disposed along the insulating area IA, the high-resistance resistor 23 and the high-resistance resistor 25 are disposed nearer to each other, the closer the high-resistance resistor 23 and the high-resistance resistor 25 are to the ground potential.
(Seventh Embodiment)

A seventh embodiment will hereinafter be described with reference to FIG. 10, mainly focusing on differences from the first embodiment.

Figure 10:
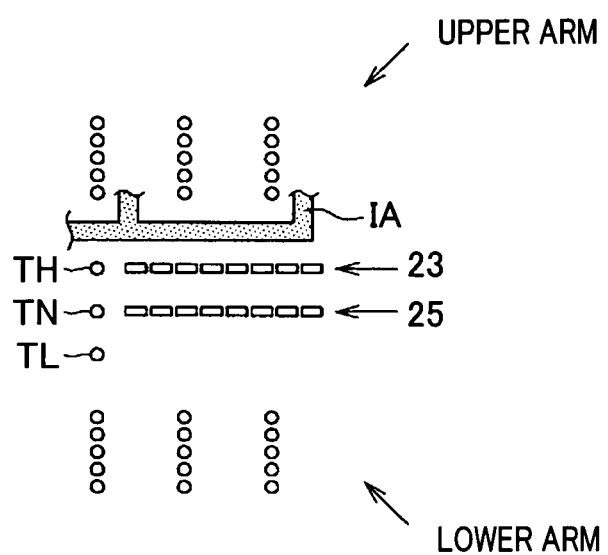
FIG. 10 is a planar view of a layout on a semiconductor substrate according to a seventh embodiment.

FIG. 10 shows a portion of the semiconductor substrate 50 according to the seventh embodiment. In FIG. 10, components corresponding to the components shown in FIG. 2 are given the same reference numbers for convenience.

As shown in FIG. 10, according to the seventh embodiment, the high-resistance resistors 23 and 25 are disposed in an area sandwiched by an upper arm and a lower arm. This configuration effectively uses an area inevitably formed by the package shape of the power cards PWC of the upper arm and the power cards PWC of the lower arm. In other words, as shown in FIG. 3, an open area is formed between the section in which the five terminals of the power card PWC of the upper arm are inserted and the section in which the five terminals of the power card PWC of the lower arm are inserted. Therefore, this area is used.

More specifically, the high-resistance resistors 23 and the high-resistance resistors 25 are each disposed in a single row in parallel with the row in the upper arm and the row in the lower arm. The high-resistance resistor 23 and the high-resistance resistor 25 are placed nearer to the low-voltage circuit area LVCA, the closer the high-resistance resistor 23 and the high-resistance resistor 25 are to the ground potential. As a result, the tip of the high-resistance resistors 23 and the tip of the high-resistance resistors 25 can be placed near the operational amplifier 21.

The terminals TH, TL and TN are disposed in an area sandwiched by the upper arm and the lower arm, on the opposite end of the high-resistance resistors 23 and 25 from the low-voltage circuit area LVCA.
(Other Embodiments)

Each of the above-described embodiments may be modified as follows.

[Regarding Voltage Detection Circuit]

For example, when the reference potential of the high voltage system is matched with the ground potential of the low voltage system, voltage division by the high-resistance resistors 25 and the low-resistance resistor 26 of the differential amplifier circuit 20, and by the high-resistance resistors 35 and the low-resistance resistor 36 of the differential amplifier circuit 30 are not required.

The configuration is not limited to that including the differential amplifier circuits 20 and 30. For example, the voltages so between the pairs of input terminals of the operational amplifiers 21 and 31 in FIG. 1 may be directly inputted into the microcomputer 40. Alternatively, for example, when the reference potential of the high voltage system is matched with the ground potential of the low voltage system, a means for directly outputting the voltage divided by the high-resistance resistors 23 and the low-resistance resistor 24 to the microcomputer 40 may be provided.

[Regarding Power Conversion Circuit]

The power conversion circuit is not limited to that composed of the pair of inverters IV1 and IV2 and the boost converter CV. For example, the boost converter CV may be eliminated. Alternatively, for example, when only a single rotating machine is provided, a power conversion circuit including only a single DC-AC (direct current to alternating current) conversion circuit (inverter) is also possible.

[Regarding Input Terminal of Voltage Detection Circuit]

The negative terminal of the capacitor C2 may be used instead of the negative terminal of the capacitor C1. In addition, the pair of terminals of the high-voltage battery 12 may be used instead of the terminals of the capacitor C1.

[Regarding Reference Potential of High Voltage System and Ground Potential of Low Voltage System]

The reference potential of the high voltage system and the ground potential of the low voltage system are not limited to those according to the above-described embodiments. For example, the positive electrode potential of the high-voltage battery 12 may serve as the ground potential of the low voltage system. In addition, that described under [Regarding voltage detection circuit] may be applied.

[Regarding Power Conversion Circuit]

The DC-AC conversion circuit is not limited to that connected to a rotating machine mechanically connected to a drive wheel. For example, the DC-AC conversion circuit may be that connected to a rotating machine installed in a compressor of an air-conditioning unit that directly uses the high-voltage battery 12 as the power supply. In addition, when an inverter for the compressor and an inverter for a main mechanism are connected in parallel to the high-voltage battery 12, a detection result of the voltage of the input terminal of the inverter for the compressor may be transmitted to an operating means of the inverter for a main mechanism. In this instance, if the substrate of the inverter for a main mechanism is separate from the substrate of the inverter for the compressor, the detection result is transmitted from the substrate of the inverter for the compressor to the substrate of the inverter for a main mechanism.

In addition, the power conversion circuit may be a direct current-to-direct current converter that drops the voltage of the high-voltage battery 12 and outputs the voltage to a battery within the low voltage system.

[Regarding Means for Operating Power Conversion Circuit]

A means for operating the power conversion circuit is not limited to that provided on the semiconductor substrate 50. For example, the means for operating the power conversion circuit may receive, through the connector 66, the detection result of the input voltage from a circuit on the semiconductor substrate 50.

[Regarding High-Potential Side and Low-Potential Side Switching Elements]

The switching elements are not limited to IGBT and may, for example, be field effect transistors, such as power metal-oxide-semiconductor (MOS) field-effect transistors. Here, the field effect transistors are not limited to N-channel field effect transistors, and may be P-channel field effect transistors. However, in this instance, in the power conversion apparatus according to the above-described fourth embodiment, the input terminal (source terminal) of the switching element is preferably used as the input terminal of the differential amplifier circuit.

[Other]

The boost converter CV may be provided between the inverter IV1 and the inverter IV2. In this instance, either of the inverter IV1 and the inverter IV2 becomes nearer to the capacitor C2 than the switching element Sw# of the boost converter CV. However, the other becomes nearer to the switching element Sw# than the capacitor C2 of the boost converter CV.

In the power conversion apparatus according to the above-described fourth embodiment, the Kelvin emitter electrode KE serving as the input terminal of the differential amplifier circuit is not limited to that of the nearest switching element.

The hybrid car is not limited to parallel and series hybrid cars. In addition, the vehicle is not limited to hybrid cars and may be, for example, electric vehicles, fuel-cell powered vehicles, and the like that do not include an internal combustion engine as a means for generating driving energy of an on-board main equipment.

What is claimed is:

1. A power conversion apparatus comprising:
   a high-voltage circuit having a power conversion circuit that converts an input voltage of the power conversion circuit to a predetermined output voltage;
   a low-voltage circuit including a control unit that controls the power conversion circuit, the low-voltage circuit operating with an operating voltage lower than an operating voltage of the high-voltage circuit;
   a voltage conversion circuit that converts the input voltage of the power conversion circuit to be a voltage having a voltage range capable of operating by the control unit, the voltage conversion circuit being provided with a first insulating area in a periphery thereof; and
   a substrate provided with a first area where at least a portion of the high-voltage circuit is formed thereon, a second area where at least a portion of the low-voltage circuit is formed thereon, an edge section covering a periphery of the substrate, and a second insulating area in a periphery of the first area, the substrate having two surfaces and the first area, the second area and the low voltage circuit are formed on an identical one surface in the two surfaces of the substrate,
   wherein the high-voltage circuit, the low-voltage circuit and voltage conversion circuit are formed on the identical one surface, and
   the first insulating area shares an area with at least either of the second insulating area or the edge section of the substrate.

2. The power conversion apparatus according to claim 1, wherein the power conversion circuit is electrically connected to a rotary electric machine serving as a primary source of vehicle driving torque.

3. The power conversion apparatus according to claim 1, wherein the high-voltage circuit and the low-voltage circuit communicate with each other via an insulating means.

4. The power conversion apparatus according to claim 2, wherein the high-voltage circuit and the low-voltage circuit communicate with each other via an insulating means.

5. The power conversion apparatus according to claim 1, wherein
   a pair of input terminals of the voltage conversion circuit are formed on the substrate, the pair of input terminals being formed along at least either of the second insulating area in the periphery of the first area and the edge section.

6. The power conversion apparatus according to claim 2, wherein
   a pair of input terminals of the voltage conversion circuit are formed on the substrate, the pair of input terminals being formed along at least either of the second insulating area in the periphery of the first area and the edge section.

7. The power conversion apparatus according to claim 3, wherein
   a pair of input terminals of the voltage conversion circuit are formed on the substrate, the pair of input terminals being formed along at least either of the second insulating area in the periphery of the first area and the edge section.

8. The power conversion apparatus according to claim 1, wherein
   the power conversion circuit includes:
   a boost circuit that boosts voltage at a DC power source and outputs a boosted voltage; and
   a DC-AC conversion circuit electrically connected between the boost circuit and a rotary electric machine, converting the boosted voltage to an AC voltage,
   the voltage conversion circuit includes:
   a first voltage conversion circuit that converts the boosted voltage; and
   a second voltage conversion circuit that converts the voltage at the DC power source,
   an input terminal having higher potential between the pair of input terminals of the first voltage conversion circuit and an input terminal having higher potential between the pair of input terminals of the second voltage conversion circuit are formed along at least either of the second insulating area in the periphery of the first area and the edge section.

9. The power conversion apparatus according to claim 1, wherein
   the voltage conversion circuit includes a plurality of resistors that divide a voltage potential between either one of the pair of input terminals and a ground potential of the low voltage circuit, and at least part of the plurality of resistors are formed along at least either of the second insulating area in the periphery of the first area and the edge section.

10. The power conversion apparatus according to claim 1, wherein the first insulating area provided in the periphery of the voltage conversion circuit shares an area with the first insulating area provided in the periphery of another high-voltage circuit.

11. The power conversion apparatus according to claim 1, wherein the first insulating area provided in the periphery of the voltage conversion circuit shares an area with the edge section of the substrate.

12. The power conversion apparatus according to claim 1, wherein
    the power conversion circuit includes a member composed of a high-potential switching element and a low-potential switching element connected in series,
    one input terminal of the voltage conversion circuit is either a terminal of the high-potential switching element that is inserted into the substrate and has the same potential as an input terminal of the high-potential switching element or a terminal of the low-potential switching element that is inserted into the substrate and has the same potential as an output terminal of the low-potential switching element.

13. The power conversion apparatus according to claim 9, wherein
    the power conversion circuit includes a serially connected member composed of a high-potential switching element and a low-potential switching element,
    one input terminal of the voltage conversion circuit is either a terminal of the high-potential switching element that is inserted into the substrate and has the same potential as an input terminal of the high-potential switching element or a terminal of the low-potential switching element that is inserted into the substrate and has the same potential as an output terminal of the low-potential switching element.

14. The power conversion apparatus according to claim 12, wherein a capacitor is connected to the pair of input terminals of the power conversion circuit, the terminal serving as one input terminal of the voltage conversion circuit is nearest to the capacitor, among terminals having the same potential.

15. The power conversion apparatus according to claim 1, wherein
the input terminal of the voltage conversion circuit is connected to the substrate by local flow soldering, and at least a portion of at least either of the second insulating area in the periphery of the first area and the edge section is included in an area in which disposal of components is prohibited because of the local flow soldering.

16. The power conversion apparatus according to claim 1, wherein
the voltage conversion circuit includes a plurality of resistors that divide a voltage potential between either one of the pair of input terminals and a ground potential of the low voltage circuit, the resistors connected to each of the pair of input terminals are disposed in a single row along at least either of the second insulating area in the periphery of the first area and the edge section, such that resistors on the ground potential side face each other.

17. The power conversion apparatus according to claim 1, wherein
the power conversion circuit includes a plurality of serially connected members, each composed of a high-potential switching element and a low-potential switching element, the high-potential switching elements and the low-potential switching elements are disposed in parallel with each other,
the voltage conversion circuit includes a plurality of resistors that divide a voltage potential between each potential of a pair of input terminals and a ground potential of the low-voltage circuit,
groups of a plurality of resistors connected respectively connected to the pair of input terminals are disposed in parallel with each other between the row of high-potential switching elements and the row of low-potential switching elements, and the groups of a plurality of resistors are disposed such that resistors closer to the ground potential are placed nearer to a section in which the low-voltage circuit is disposed.

* * * * *